No. 727,884. PATENTED MAY 12, 1903.
E. A. BIRCHER.
RULE GAGE.
APPLICATION FILED DEC. 17, 1902.
NO MODEL.
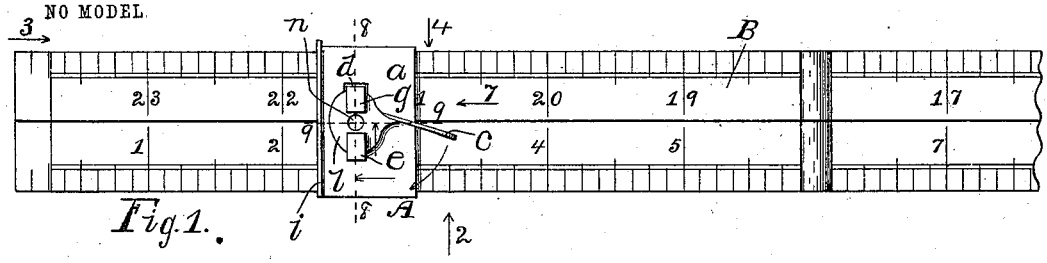
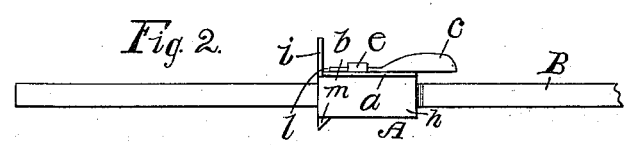 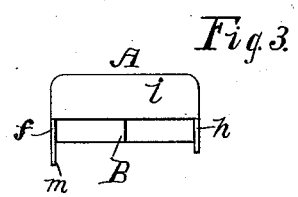
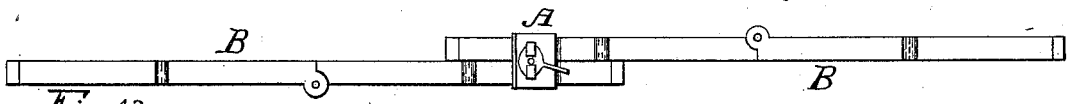
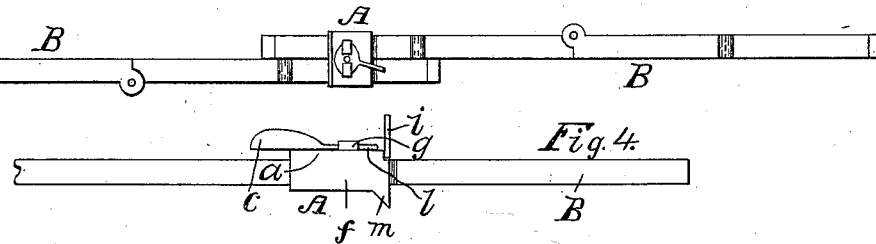
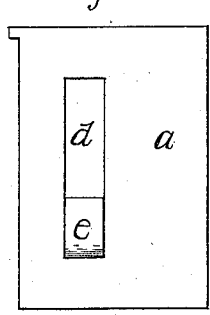 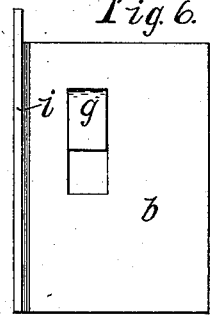 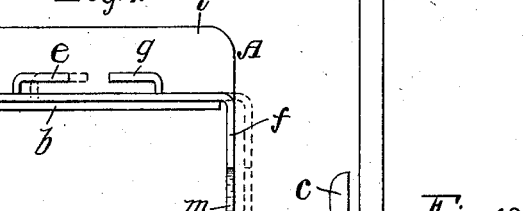 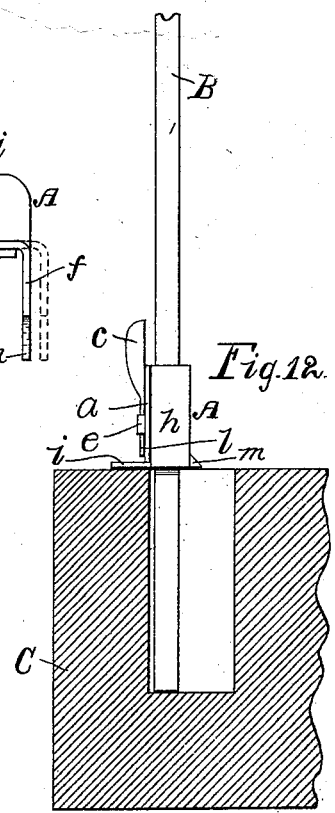
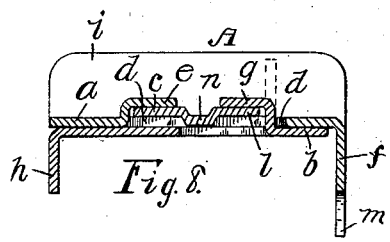 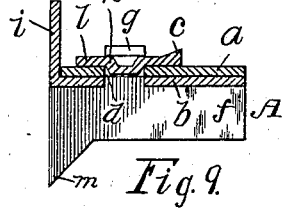
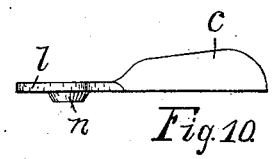 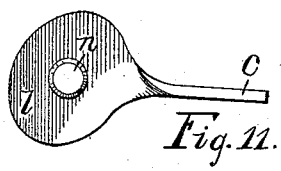
Attest:
M. B. Smith.
M. W. Phillips.
Inventor:
E. A. Bircher,
By E. B. Whitmore, Atty.
THE NORRIS PETERS CO., PHOTO-LITHO., WASHINGTON, D. C.

No. 727,884. Patented May 12, 1903.

UNITED STATES PATENT OFFICE.

EUGENE A. BIRCHER, OF ROCHESTER, NEW YORK.

RULE-GAGE.

SPECIFICATION forming part of Letters Patent No. 727,884, dated May 12, 1903.

Application filed December 17, 1902. Serial No. 135,625. (No model.)

*To all whom it may concern:*

Be it known that I, EUGENE A. BIRCHER, of Rochester, in the county of Monroe and State of New York, have invented a new and useful Improvement in Rule-Gages, which improvement is fully set forth in the following specification and shown in the accompanying drawings.

My invention is a gage designed to be conveniently attached to a measuring implement, as an ordinary wooden folding two-foot rule used by mechanics and others for measuring short distances.

One object of my invention is to produce a metallic body constituting a rule-gage consisting of associated parts movably connected and so constructed and operating that the gage may be either readily attached to or detached from the rule or shifted longitudinally thereon, as may be desired.

Another object of the invention is to so construct the gage that though its parts are all freely movable one upon another they cannot become separated or fall apart when detached from the rule.

A further object of my invention is to produce a rule-gage constructed of three connected parts movable upon one another and permanently held together without the aid of screws, rivets, or similar fixed structural parts serving only as pivots or centers of motion.

Other objects and advantages of my invention will be brought out and made to appear in the following specification, reference being had to the accompanying drawings, forming a part of the same, the invention being more particularly pointed out in the claims.

Figure 1 is a plan of my improved gage shown attached to a measuring-rule as in use. Fig. 2 is a side view of the same, indicated by arrow 2 in Fig. 1. Fig. 3 is an end view indicated by arrow 3 in Fig. 1. Fig. 4 is a side view of the parts seen as indicated by arrow 4 in Fig. 1. Fig. 5 shows the upper face of the outer section of the gage detached. Fig. 6, detached, shows the outer face of the inner section of the gage. Fig. 7 is an end view of the gage seen as indicated by arrow 7 in Fig. 1, a part being shown in two positions by full and by dotted lines and a part omitted. Fig. 8 is a central longitudinal section of the gage, taken on the dotted line 8 8 in Fig. 1. Fig. 9 is a transverse section on the dotted line 9 9 in Fig. 1. Fig. 10 is a side elevation of the lever detached. Fig. 11 is a view of the under surface of the lever detached. Fig. 12 is a side view of the gage and attached rule, showing one use of the gage. Fig. 13, drawn to a reduced scale, is a plan showing two rules joined by the gage. Figs. 1 to 4, inclusive, and Fig. 12 are drawn full size. Figs. 5 to 11, inclusive, are drawn double the size of the gage.

Referring to the parts shown, A is my improved gage, shown as in place upon an ordinary measuring-rule B. This gage consists of an upper rectangular plate or section *a*, Figs. 1, 2, 5, 7, 8, 9, and 12, an under section *b*, and an operating-lever *c*, all made preferably of sheet-brass bent and cut to form. The upper section *a* is formed with a longitudinal elongated slot or opening *d*, Figs. 5, 8, and 9, and an upturned angular tongue or extension *e*, Figs. 1, 2, 5, 7, and 8, rising above the body of the section, said tongue being formed of a part of the material removed to form the slot *d*. This section *a* is also formed with a downturned flange *f*, Figs. 3, 4, 7, 8, and 9, to overhang the edge of the rule B when the gage is placed thereon, as shown.

The under part or section *b* of the gage, Figs. 6 to 9, also rectangular in form, is formed with an upturned angular tongue or extension *g*, Figs. 1, 4, 6 to 9, similar to the tongue *e* of the section *a*, which tongue *g* when the sections are put together extends upward through the opening *d* in the section *a*, as shown in Fig. 8. These tongues *e g* each consist of a vertical part and a horizontal part, the vertical parts being unequal in length and the horizontal parts turned toward each other. The horizontal parts of the tongues are equal and directly opposite, as shown, both being in a plane parallel with the bodies of the sections. When the gage is placed upon the rule B, the section *b* rests directly upon the surface of the rule, said section having a flange *h* overhanging the edge of the rule, as shown. The section *b* is also formed with an upturned part *i*, standing across the rule, the plane of the face of said part *i* being at right angles with both the adjacent face of the rule and with the lines of its two edges.

The lever c, Figs. 1, 2, 4, 8, 9, and 12, is of novel form and action, it being provided for controlling and actuating the two sections a b of the gage. This lever is formed with a cam-shaped head l, resting flat upon the upper section a and occupying the space beneath the horizontal parts of the two tongues e g and between their vertical parts, as shown. Thus placed the opposing edges of the head l are in positions to press oppositely and in outward directions against the vertical parts of the tongues when the lever is turned or given a swivel motion in the direction indicated by the curved arrow in Fig. 1. This turning of the lever and the resulting pushing apart of the tongues serves to slide the sections upon each other and draw the opposing flanges f h toward each other, and so firmly press the rule between them, which temporarily secures the gage to the rule, as for use. An opposite movement of the lever acts to loosen the parts when it is wished to shift the gage along the rule or detach it therefrom.

The head l of the lever c is formed with a central extended conical part n, projecting downward into the slot or opening d of the section a, as shown in Figs. 8 and 9, around which part n the pivotal or swivel motions of the lever above described are made. The lever is free to move in and along the opening d and to turn, as above stated; but it cannot become detached or separated from the section a on account of the part n being engaged and held by the side walls of the opening and on account of the closely-overlapping tongues or extensions e g, which prevent the lever from rising out of the said opening d, nor can the under section b become detached from the other parts of the gage, as the presence of the lever prevents the tongue g from passing downward out of the opening d. Thus the parts of the gage—three in number—though free to move upon one another cannot become separated or detached from one another, but must remain together at all times, as when the gage is detached from the rule and out of use.

Primarily the tongue g is turned up straight, as shown by dotted lines in Fig. 8, and when the lever is put in place under the tongue e, with the part n in the opening d, the tongue g is bent down upon the head of the lever, as shown in full lines, which permanently locks or secures the parts together, as stated. Thus assembled the three parts of the gage may move freely upon one another, but the actuating-lever c can have no motion crosswise of the elongated opening d on account of the part n occupying said opening.

The flange f is formed with an extended marking point or scribe m as a convenience for marking or pricking off the distance measured with the rule upon a board or other body to which the rule is applied.

The gage is constructed to have the front surface of the raised part i and the adjacent end surfaces of the flanges f h in a plane, which will be understood by viewing Figs. 2, 4, 9, and 12, said plane being at right angles with the rule. The marking-point m also coincides with the plane. On account of this form of the gage the distance upon the rule measured in any case may be read with equal facility from either side of the rule, thus avoiding the necessity of turning the rule over to read off the measurement, as otherwise would have frequently to be done.

One use of the gage is shown in Fig. 12, the same being in measuring or gaging the depths of holes. In this use of the gage the face of the part i is caused to meet the surface of the body C, pierced with the hole, as shown. A further use of the gage is also shown in Fig. 13, in which two rules are bound together for measuring longer distances than a single rule would reach. In putting the rules together they may be lapped more or less, as may be required, and then firmly bound together to act as a single measuring implement.

What I claim as my invention, and desire to secure by Letters Patent, is—

1. A rule-gage consisting of two sections placed movably one upon the other, the upper section having an opening, and an actuator for the sections placed against the upper section, and means for permanently holding the parts together, the actuator having a part out of the plane of its body portion to engage the adjacent section, substantially as shown and set forth.

2. A device of the kind described, consisting of main sections placed one upon the other, the upper section having an opening, and an actuator for the sections in contact with the upper section and having a portion engaging an opening therein, and means for holding the actuator and the sections together and to prevent the actuator from moving upon the adjacent section in a direction transverse of said opening and means for holding said parts permanently together, substantially as and for the purpose specified.

3. A device of the kind described, consisting of main sections placed one upon the other, the upper section having an elongated opening, and an actuator for the sections in contact with the upper section and having a portion engaging an opening therein, the actuator having motion longitudinally of said opening, means for holding said parts permanently together, and means for holding the parts in contact, substantially as shown and described.

4. A device of the kind described, consisting of main sections placed one upon the other, the upper section having an opening, and an actuator for the sections adjacent to the upper one, the actuator having a part to occupy the opening of the adjacent section, the sections and the actuator being movable one upon another, and means for holding the parts together, substantially as set forth and shown.

5. A rule-gage having two sections placed one upon the other and formed with flanges overhanging the respective edges of the rule, one of the sections having an upturned part crossing the face of the rule, and means having a part out of the plane of its body portion and engaging one of said sections for sliding the sections upon each other, to cause the flanges to oppositely press the rule and means for preventing separation of said parts, substantially as and for the purpose specified.

6. A rule-gage having two sections joined, and formed with flanges overhanging the edges of the rule, one of the sections having an extended point or marker, and means having a pivot portion out of the plane of its body portion for moving the sections upon each other to cause the flanges to engage the rule and means for permanently connecting said parts together, substantially as shown and described.

7. A rule-gage having two sections joined, and formed with flanges at the edges of the rule, one of the sections having an upturned part at its side, the surface of said upturned part and the surfaces of the ends of the flanges being in a plane, a lever having a central extended conical part and a cam-head, said conical part engaging an opening in one of said sections, substantially as and for the purpose set forth.

8. A device of the kind described comprising sections placed one upon the other, the upper section having an opening and one of the sections having an extended pointed marker, and an actuator for the sections connected with the upper one, said actuator having a part deflected out of the plane thereof and engaging the adjacent section, said sections and actuator being movable one upon the other, and means for holding said parts together.

9. A rule-gage comprising an upper and a lower section and an operating-lever, the latter having a portion engaged in an opening in the upper section and portions disposed beneath oppositely-extending portions on the upper and lower sections.

10. A rule-gage consisting of an upper section having a longitudinal opening and a tongue, an under section having a longitudinal opening and a tongue, said sections being overlapped with the tongue of the under section passed through the opening of the upper section, and an actuator disposed beneath said tongues having a portion out of the plane of its body portion engaged with the upper section for actuating the sections.

11. A rule-gage consisting of an upper section having a longitudinal opening and a tongue, an under section having a longitudinal opening and a tongue, said sections being overlapped with the tongue of the under section passed through the opening of the upper section, and an actuator disposed beneath said tongues for actuating the sections, said actuator having a depressed portion working in the opening of said upper section and serving as a pivot on which the actuator moves.

12. A rule-gage consisting of upper and lower sections each with a longitudinal opening and bendable tongue with the tongue of one passed through the opening of the other, with both tongues extending in opposite directions in the same horizontal plane, and a cam-lever disposed beneath said tongues and held thereby against displacement, said cam-lever having a portion extending within the opening of the upper section and serving as the pivot for said lever.

In witness whereof I have hereunto set my hand, this 12th day of December, 1902, in the presence of two subscribing witnesses.

EUGENE A. BIRCHER.

Witnesses:
ENOS B. WHITMORE,
MINNIE SMITH.